Patented June 3, 1924.

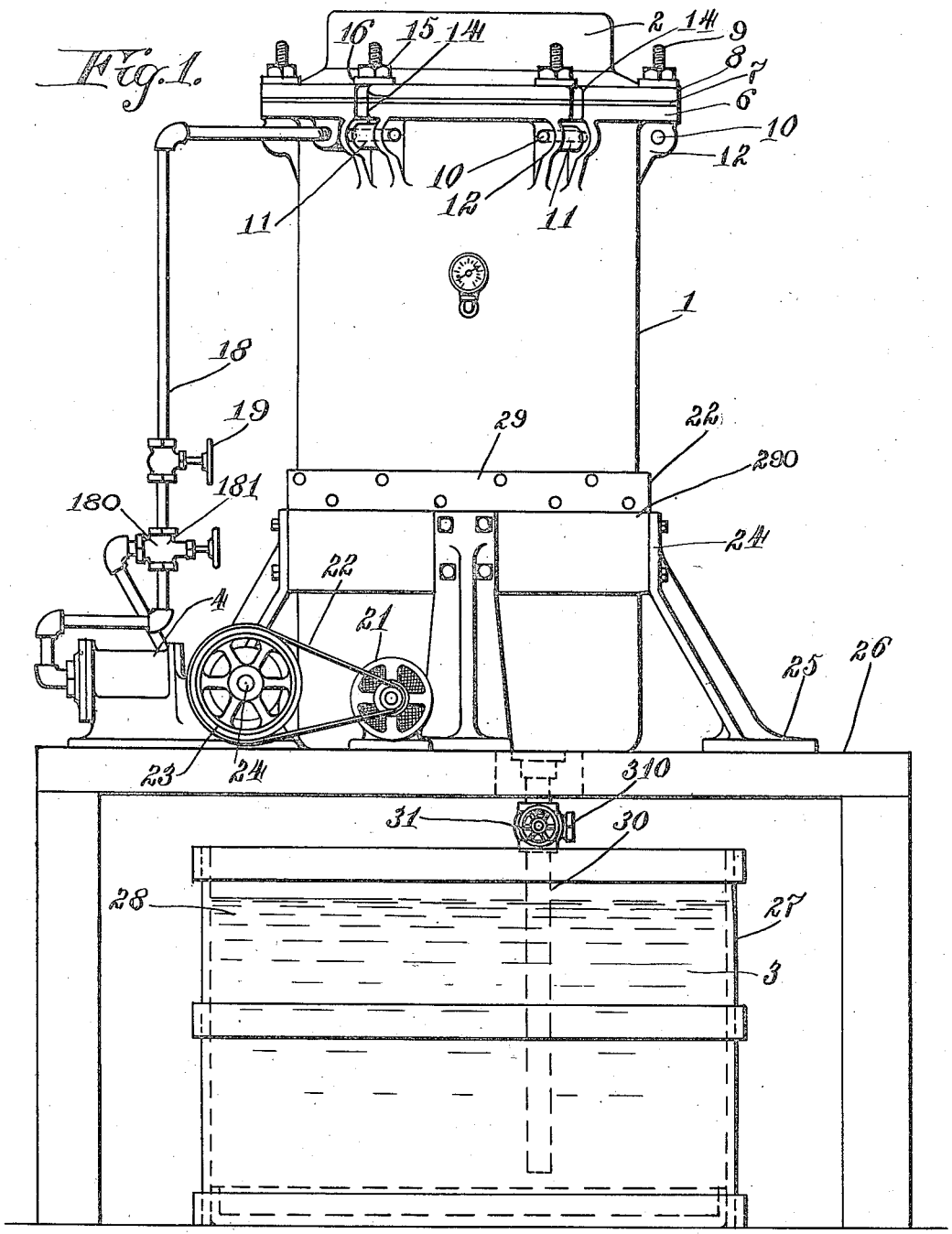

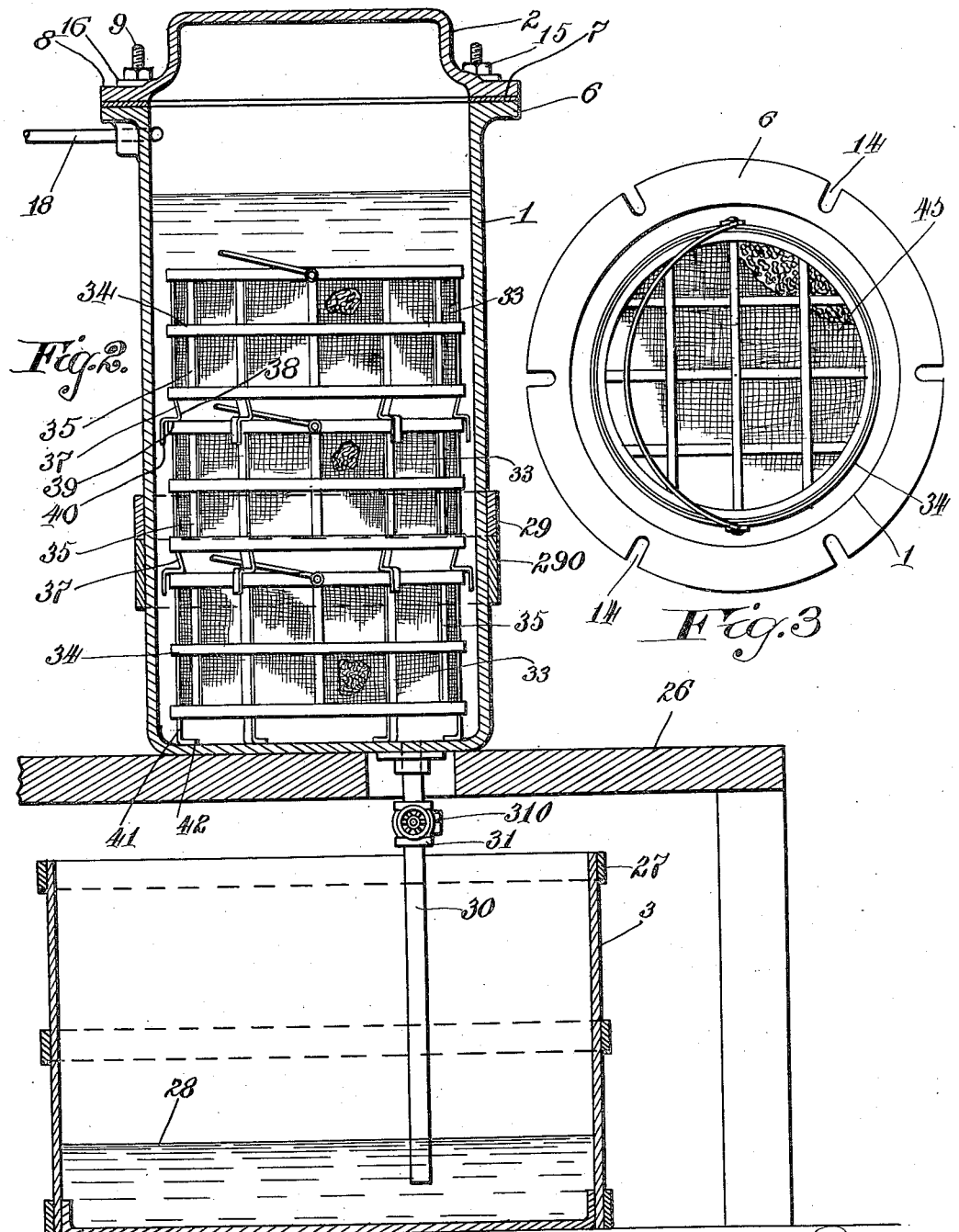

1,496,557

UNITED STATES PATENT OFFICE.

HUNTINGTON D. SAWKINS, OF BALTIMORE, MARYLAND.

APPARATUS FOR SALTING PEANUTS.

Application filed February 28, 1923. Serial No. 621,958.

*To all whom it may concern:*

Be it known that I, HUNTINGTON D. SAWKINS, a citizen of the United States of America, residing in the city of Baltimore, State of Maryland, have invented certain new and useful Improvements in Apparatus for Salting Peanuts, of which the following is a specification.

The treatment of peanuts to produce the commodity generally known to the trade as salted peanuts is well understood. The shelled peanuts are cooked in butter or other grease and salt. So treated they can be eaten only in small quantities on account of the richness and the excess of salt on the surface.

The object of the present invention is to produce a different and superior product, avoiding the excess of grease and salt and to do this by a quicker and cheaper method. The peanuts being impregnated with just the desired amount of salt to flavor them.

The invention, relates to a method and apparatus for salting peanuts in the shell. In accordance with the method of my invention the peanuts are first treated in a vacuum which is understood to have the effect of withdrawing the air from the cellular structure of the peanuts. After the peanuts have been subjected to the action of a vacuum for a sufficient period which may be of any desired length but is preferably about fifteen minutes the peanuts are immersed in brine which is permitted to partially or wholly fill the vacuum. The brine is then removed by gravity or pumping as preferred and the peanuts are treated in any suitable manner as by an air draft or by subjecting to air pressure and permitting the air to escape in the form of a blast carrying the liquid with it.

Other attempts have been made to salt peanuts by soaking in brine under pressure, these have not been successful in the absence of some means or provision for removing the liquid from the peanuts before roasting. The peanuts treated by the old method had the appearance of having been boiled.

After drying, the peanuts are roasted in the usual way.

The apparatus consists of a vacuum salting tank with means for removing the air therefrom to establish the desired vacuum and suitable connections for introducing and removing the brine. The apparatus also includes baskets to hold the peanuts with supports to keep the baskets separated to provide for the ready access of the brine to the peanuts and for the release of the brine in drying the peanuts.

In the accompanying drawing I have illustrated an apparatus constructed in accordance with my invention.

In the drawing:

Figure I is a side elevation showing the vacuum salting container in elevation also the brine supply tank and pump.

Figure II is a vertical central section through the vacuum salting container also showing the brine supply tank, and:

Figure III is a plan view of the vacuum salting container with the cover removed.

Referring to the drawing by numerals the apparatus as shown consists of a vacuum container, 1, open at the top and having a cover, 2, with means for securing the same so that the container is air tight. The apparatus also includes a brine supply tank, 3, and means for withdrawing air from the container, or pumping it full of air when desired to blow out the liquid which wets the nuts after the brine has been drawn out.

More particularly the container, 1, has a horizontal flange, 6, at the top surrounding the opening. Overlying this flange is a suitable gasket or packing, 7. The cover is likewise provided with a flange, 8, corresponding in circumference to the flange, 6, and resting on the gasket, 7, and the cover is secured in position by bolts, 9, which in the form of the invention shown and preferably are connected at their lower ends to the container by means of transverse pins, 10, passing through eyes, 11, in the ends of the bolts, 9, and seated at their ends in suitable ears, 12, projecting from the sides of the container.

By this arrangement the bolts swing in radial planes of the container which as shown is cylindrical, radial slots, 14, spaced about the circumference of each flange, corresponding slots in the cover flange and in the container flange being in registration are provided to receive each bolt and the cover is held by nuts, 15, one on each bolt turned down against washers, 16, resting on top of the cover flange. This arrangement provides for a quick release of the cover by merely loosening the nuts and swinging the bolts 9, out of the slots, 14.

As shown the air pump, 4, is connected by means of a pipe, 18, with the container at a point near the top and the air pipe is controlled by a valve, 19. The pump as shown is driven by an electric motor, 21, through belt, 22, engaging pulley, 23, secured to the crank shaft, 24, of the pump. Preferably I have a double connection to the pump leading to both the suction and pressure sides by way of T 180 controlled by three way valve 181 which connects either suction or pressure to the air pipe, 18, connecting the other side to the atmosphere. This provides for creating a vacuum or forcing air into the container for blowing out the water remaining after draining.

As shown the container is encircled by bands, 29, and 290 and to the latter band are secured braces or brackets, 24, which are also secured, at their lower ends at, 25, to a raised support, 26, or other suitable support which may be the floor of the building. Beneath the support I have shown a brine supply tank, 27, containing liquid brine, 28.

In the form of the invention shown a pipe, 30, leads down from the bottom of the container, 1, into the brine tank to a point well beneath the normal level of the brine. This pipe is also controlled by a valve, 31, and there may be an air opening, 310, the valve, 34, being a two way valve for this purpose so that it may either be closed, opened to the brine or opened to the outside air.

Having particular reference to Figures 2 and 3 I have shown inside the container a number of wire baskets, 33, for holding the peanuts, to be salted. These are preferably of short cylindrical form braced by metal rings, 34, as, one at the top, one at the bottom and one at the center of each basket. The rings are connected by upright members in the form of metal bands, 35, spaced along the circumference and secured, each said vertical member to each ring.

The baskets may be provided with spacing members, 37, which in the form of the invention illustrated are formed from the bottom ends of the alternate uprights, 35. Some of these spacing members which are intended to engage the baskets below are formed by bending the uprights slightly inward at, 38, and then bending them outward in a horizontal plane as at, 39, and then bending the ends downward in a vertical plane, as at, 40. The horizontal portions rest on the top of the basket next below and the vertical ends, 40, engage the outer surfaces of the baskets or the top rings thereof positioning the baskets in their relation to each other. The bottom spacing members 41, are formed by turning at right angles the ends, 42, of the alternate uprights, 35, which extend below the bottom.

In accordance with the method which is the subject of my invention I first remove the cover, 2, and having filled the baskets, 33, with peanuts and replaced the covers, 45, thereon I insert the baskets. In the arrangement shown, it is understood that the baskets are merely a preferred feature and that the process may be performed in accordance with my invention by merely placing the peanuts in the container. It is, however of great advantage to provide spaces between the masses of peanuts so that the brine may enter and escape easily and quickly.

Having placed the peanuts in the container I replace the cover and clamp it tightly in position so that it will be air tight, effecting an air tight closure by tightening the nuts, 15, first having swung the bolts into the place.

After closing the container as aforesaid I remove the air therefrom and from the interstices between the peanuts thus subjecting them to vacuum treatment and providing for an easy absorption of the brine by the peanuts. This removal of the air from the container may be accomplished in any suitable manner. In the drawing I have illustrated an air pump with means for operating the same and a pipe connecting the pump to a point near the top of the container. The pump is run for a sufficient period to give a very marked vacuum, the higher the vacuum the more quickly will the brine be drawn into the container and absorbed by the peanuts.

In accordance with my process in the preferred form I treat the peanuts under vacuum for fifteen or twenty minutes to half an hour but the period of vacuum treatment may be widely varied within the scope of my invention. The exact period of treatment being in nowise essential.

When the air has been sufficiently exhausted I introduce the brine in any preferred manner, the vacuum treatment as aforesaid being provided for the quick and thorough absorption of the brine by the peanuts. Preferably the brine tests, 100, by hydrometer.

I close the valve, 19, in the air pipe to prevent the brine from having access to the pump and open the valve, 31, in the brine pipe to provide for the entrance of the brine into the container, the same being drawn by suction from the brine supply tank. The valve, 31, is closed to hold the brine. I then allow the peanuts to stand in the brine preferably about twenty minutes. I then release the brine permitting it to flow back into the tank. To dry the product I preferably pump air into the container either blowing it through or alternately fill the container with air under pressure and then release it one or more times blowing the moisture out of the container and drying the salted peanuts. The peanuts are then roasted in the usual manner. Having just the desired salty taste. I then take them out of the container and allow them to stand about twenty minutes.

The process described has the advantages that it may be performed cheaply and quickly making it possible to treat large quantities of peanuts at one time and that it eliminates the expense of shelling the peanuts prior to the salting.

Various nuts may be treated in the shells in the manner herein described.

I have thus described my invention both as to my preferred apparatus and as to my method of salting peanuts in connection with which that apparatus may be employed. The description being specific and detailed in order that the nature of the invention and the method of utilizing the same may be fully understood, however, these specific terms herein are used descriptively rather than in a limiting sense. The scope of the invention being defined in the claim.

What I claim and desire to secure by Letters Patent is:

An apparatus for salting peanuts, consisting of a container having a removable cover at the top and means for securing the cover to form an air-tight closure, removable baskets for peanuts within the container with means for supporting the same, an air pump with a pipe connecting the same to the container, said connections including a three-way valve, and branch pipes from the suction and from the exhaust of said pump leading to said three-way valve whereby the pump may be utilized by merely turning the valve to either create a vacuum or pressure in the container, an open tank for brine, a pipe leading from the container to the lower portion of the tank and a valve in said pipe whereby the container may be filled with brine and the brine returned to the brine tank by the vacuum or pressure, respectively, in the tank, the supply of brine being controlled by the valve in the brine pipe.

Signed by me at Baltimore, Maryland, this 27th day of February, 1923.

HUNTINGTON D. SAWKINS.

Witnesses:
PORTER H. FLAUTT,
RUTH A. GAWTHROP.